(12) United States Patent
Coles et al.

(10) Patent No.: US 7,287,796 B2
(45) Date of Patent: Oct. 30, 2007

(54) INTEGRATED CARGO NET FOR A VEHICLE

(75) Inventors: Anthony Coles, Peacehaven (GB); Fredrik Overgaard, Torslanda (SE)

(73) Assignee: Ford Global Technologies, LLC, Dearborn, MI (US)

( * ) Notice: Subject to any disclaimer, the term of this patent is extended or adjusted under 35 U.S.C. 154(b) by 15 days.

(21) Appl. No.: 11/276,278

(22) Filed: Feb. 22, 2006

(65) Prior Publication Data
US 2007/0194583 A1  Aug. 23, 2007

(51) Int. Cl.
*B60P 7/06* (2006.01)
*B60R 5/04* (2006.01)

(52) U.S. Cl. .............. 296/24.43; 296/37.7; 296/97.8; 160/84.06; 160/370.23

(58) Field of Classification Search .............. 296/24.4, 296/24.43, 24.46, 37.7, 37.16, 97.4, 97.8, 296/136.04; 160/84.04, 84.06, 170, 370.23; 280/748, 749
See application file for complete search history.

(56) References Cited

U.S. PATENT DOCUMENTS

| | | | | |
|---|---|---|---|---|
| 41,911 A | * | 3/1864 | Emery | 160/84.06 |
| 1,959,137 A | * | 5/1934 | Miller | 160/84.06 |
| 2,843,420 A | * | 7/1958 | Rich | 280/753 |
| 3,423,121 A | * | 1/1969 | Lipkin | 296/24.4 |
| 3,465,806 A | * | 9/1969 | Sulkes | 160/84.06 |
| 3,831,975 A | | 8/1974 | Mednikow | |
| 3,891,263 A | * | 6/1975 | Orsulak | 296/24.43 |
| 4,818,007 A | * | 4/1989 | Mahoney | 296/24.41 |
| 5,076,633 A | * | 12/1991 | Hsu et al. | 296/97.4 |
| 5,288,122 A | * | 2/1994 | Pilhall | 296/24.43 |
| 5,355,928 A | * | 10/1994 | Robertson | 160/84.04 |
| 5,575,524 A | * | 11/1996 | Cronk | 296/142 |
| 5,711,568 A | * | 1/1998 | Diem et al. | 296/37.16 |
| 5,839,757 A | | 11/1998 | von Lange et al. | |
| 6,279,639 B1 | | 8/2001 | Schlecht et al. | |
| 6,318,789 B1 | * | 11/2001 | Stuart | 296/97.8 |
| 6,349,986 B1 | | 2/2002 | Seel et al. | |
| 6,390,526 B1 | | 5/2002 | Ament et al. | |
| 6,598,921 B2 | | 7/2003 | Seel et al. | |
| 6,601,635 B2 | * | 8/2003 | Ciuca et al. | 160/170 |
| 6,672,619 B1 | * | 1/2004 | Ennerdal et al. | 280/749 |
| 6,709,039 B1 | * | 3/2004 | Davenport | 296/37.16 |
| 6,758,517 B1 | * | 7/2004 | Raasakka | 296/214 |
| 7,114,769 B2 | * | 10/2006 | Storc et al. | 296/219 |
| 2002/0033616 A1 | * | 3/2002 | Schlecht et al. | 296/138 |

(Continued)

FOREIGN PATENT DOCUMENTS

DE          3909397 A1 *  10/1990

(Continued)

*Primary Examiner*—Dennis H. Pedder
*Assistant Examiner*—Paul Chenevert
(74) *Attorney, Agent, or Firm*—Brooks Kushman P.C.

(57) ABSTRACT

A cargo net assembly for a vehicle is described that includes a storage receptacle. The storage receptacle is mounted to the inside of the roof of the vehicle. Pivotable doors may be opened to allow the net to be lowered with a base plate into a use position. The base plate is held in place when deployed by right and left anchors. A latch assembly is provided to latch the doors in their closed position. The latch assembly is opened by a dual cable acting upon dual bell crank cams.

19 Claims, 9 Drawing Sheets

U.S. PATENT DOCUMENTS

| | | | |
|---|---|---|---|
| 2002/0056980 A1* | 5/2002 | Saczalski et al. | 280/748 |
| 2002/0067047 A1* | 6/2002 | Seel et al. | 296/24.1 |
| 2002/0089209 A1* | 7/2002 | Kobayashi et al. | 296/97.4 |
| 2002/0096900 A1* | 7/2002 | Moore | 296/24.1 |
| 2004/0056504 A1* | 3/2004 | Hattass et al. | 296/97.1 |
| 2004/0140060 A1* | 7/2004 | Judkins | 160/84.04 |

FOREIGN PATENT DOCUMENTS

| | | | | |
|---|---|---|---|---|
| DE | 4128527 A1 | * | 3/1992 | |
| DE | 4239470 A1 | * | 5/1994 | |
| EP | 189169 A2 | * | 7/1986 | |
| FR | 2699875 A1 | * | 7/1994 | |
| JP | 55094827 A | * | 7/1980 | |
| JP | 62127019 A | * | 6/1987 | 160/84.04 |
| JP | 62128827 A | * | 6/1987 | |
| JP | 01204836 A | * | 8/1989 | |
| JP | 01204837 A | * | 8/1989 | |
| JP | 03287422 A | * | 12/1991 | |
| WO | WO 8800140 A1 | * | 1/1988 | |

\* cited by examiner

INTEGRATED CARGO NET FOR A VEHICLE

BACKGROUND OF THE INVENTION

1. Field of the Invention

The present invention relates to a cargo net assembly for a vehicle that comprises a cargo net, affixation elements, and a storage compartment.

2. Background Art

Cargo nets are used to partition a cargo storage area from a passenger compartment of a vehicle. Cargo nets may be used to restrain cargo and can prevent cargo from shifting into the passenger compartment.

Prior art cargo nets, or load nets, are secured within a vehicle in a variety of ways. A simple cargo net may be secured to buttons on a vehicle body by loops or gussets attached to the cargo net. Another type of cargo net may be secured by a tube frame to a vehicle that may be anchored to the vehicle roof and floor behind a seat of the vehicle. This approach provides a rigid and durable cargo net, but requires substantial space within the vehicle and is difficult to store when not in use.

Another approach to providing a cargo net in a vehicle is to provide a cargo net that is mounted on a winding shaft that is tensioned by means of a spring motor. This type of safety net is mounted within a housing that may be assembled to a rear seat back rest. This approach may require the seats of the vehicle to be in a seating position. The winding shaft and spring motor combination is a relatively complex structure.

Another approach to providing a cargo net is to provide a motor driven cargo net that may be automatically moved between an operative and a non-operative position by a servo motor in response to a sensed increase in load level. The cargo net may be stored in a cassette or other storage housing that is mounted on the rear seat of the vehicle. This proposed solution is expensive and complex and requires space in the cargo area of the vehicle for the cargo net cassette. It also requires that the rear seat of the vehicle remain in its upright or seating position to be functional.

There is a need for a simple and cost-effective cargo net that may be conveniently stored in a vehicle and that requires minimal storage space. There is also a need for a cargo net storage mechanism that may be deployed with the seats of a vehicle in any possible position because the cargo net deployment function is independent of seat positioning.

The present invention addresses the above needs and overcomes problems associated with prior art cargo nets and cargo net storage devices.

SUMMARY OF THE INVENTION

According to one aspect of the present invention, a cargo net for a vehicle is provided for dividing the interior space within the vehicle into passenger space and cargo space. The cargo net comprises a flexible net segment that has a base rail secured to a bottom edge of the net. A receptacle may be secured to the roof of the vehicle with the net being attached near its top edge to the receptacle. Right and left attachment clips are secured to opposite sides of the base rail. The attachment clips may be selectively secured to the vehicle in a stored position adjacent to the receptacle. The attachment clips may be secured in a deployed position to hold the base rail between anchoring points located on the vehicle interior. In the deployed position, the rail is spaced from the receptacle with the net at least partially spanning the space between the rail and the receptacle.

According to other aspects of the invention, at least one cord is provided on which the net segment is entrained. Two cords may be provided on opposite lateral sides of the net segment. Each cord reinforces and supports the sides of the net and is retractable. The cords facilitate retracting the net segment and rail toward the receptacle. Reels are provided about which the cords may be wound as the cords retract the net segment and rail toward the receptacle. The net may be formed into pleats that fold when the net is retracted for storage in the receptacle.

According to another aspect of the invention, the rail may be an elongated member having a first surface that is oriented to face the roof when in the stored position, and a second surface that faces in the opposite direction. The rail is re-oriented when deployed with the first and second surfaces facing in opposite, generally fore-and-aft directions. Alternatively, the rail may be slimmer and may be non-rotating. The rail, or bottom bar, may have body side attachments that extend to the vehicle.

According to another aspect of the invention, the attachment clips may be secured to spaced vertical walls of the vehicle when the cargo net is deployed. The attachment clips may be secured to the vehicle near opposite lateral ends of the receptacle when the cargo net is stored in the receptacle to retain the cargo net in the receptacle. The base may be secured to the vehicle in a lowered position at a location that is spaced above a floor of the vehicle.

According to a further aspect of the invention, a cover may be provided having two doors that are pivotable about an axis on opposite lateral sides of the receptacle. The doors in their closed position cover the stored net and are opened to facilitate net deployment. The doors may be closed after the base rail is secured to the vehicle by the attachment clips.

According to another aspect of the present invention, a load net is provided for dividing the interior space of the vehicle into a passenger compartment and a cargo compartment. The load net comprises a segment of net material that has a rail secured near a first edge of the segment of net material. A first attachment catch assembly is assembled to a first end of the rail and a second attachment catch is assembled to a second end of the rail opposite the first attachment catch. A receptacle is secured near a second edge of the net on the opposite side of the load net. The receptacle is attached to the vehicle interior. First and second cords extend between the rail and the receptacle along first and second sides of the load net. The load net has a stowed position in which the segment of net material on the rail are received in the receptacle and a deployed position in which the rail is spaced from the receptacle. The load net spans the space between the rail and the receptacle. The rail is secured to the vehicle by the first and second attachment catches in the deployed position.

According to other aspects of the invention as they relate to the load net, the receptacle may be secured to the roof of the vehicle and the rail may be moved vertically relative to the receptacle. Alternatively, the receptacle may be secured to the floor of the vehicle with the rail being moved vertically relative to the receptacle.

According to other aspects of the invention, the first and second cords may be wound around first and second reels as the cords retract the net segment and rail toward the receptacle. The segment of net material may be formed into pleats that fold when the segment of net material is retracted for storage in the receptacle.

According to other aspects of the invention, the receptacle may have a lower face that defines an opening that extends in a transverse direction across the vehicle. The rail, when in the stowed position, covers the opening. The segment of net material, when in the deployed position, may extend through the opening in the lower face of the receptacle.

According to another aspect of the invention, the first and second catches may comprise anchoring loops that may be extended from an internal cavity in the rail. The anchoring loops are stored in an internal cavity in the rail. The anchoring loops may be extended from the internal cavity for attachment to the vehicle to hold the load net in the deployed position.

According to other aspects of the invention, first and second cords may be routed through a reinforcing strip on opposite sides of the segment of net material. The reinforcing strip may have a plurality of holes through which the first and second cords are routed.

According to another aspect of the invention, a load net is provided for use with the vehicle having an interior space and may be divided into a passenger compartment and a cargo compartment. The load net may be used to divide the passenger and cargo compartment. The load net comprises a segment of net material that is secured on a bottom edge to a base rail. First and second anchoring loops are assembled to right and left ends of the base rail. A receptacle is attached to the vehicle roof and an upper edge of the net material. First and second cords extend between the base rail and the receptacle along first and second sides of the load net. The load net has a stowed position in which the segment of net material and the base rail are received in the receptacle. The load net also has a deployed position in which the rail is spaced from the receptacle. In the deployed position, the load net spans at least a portion of the space between the base rail and the receptacle. The base rail is secured to the vehicle by the first and second anchoring loops in the deployed position.

Other aspects of the invention will be apparent in view of the attached drawings and the following detailed description of the illustrated embodiment.

DETAILED DESCRIPTION OF THE PREFERRED EMBODIMENT(S)

Figure 1:
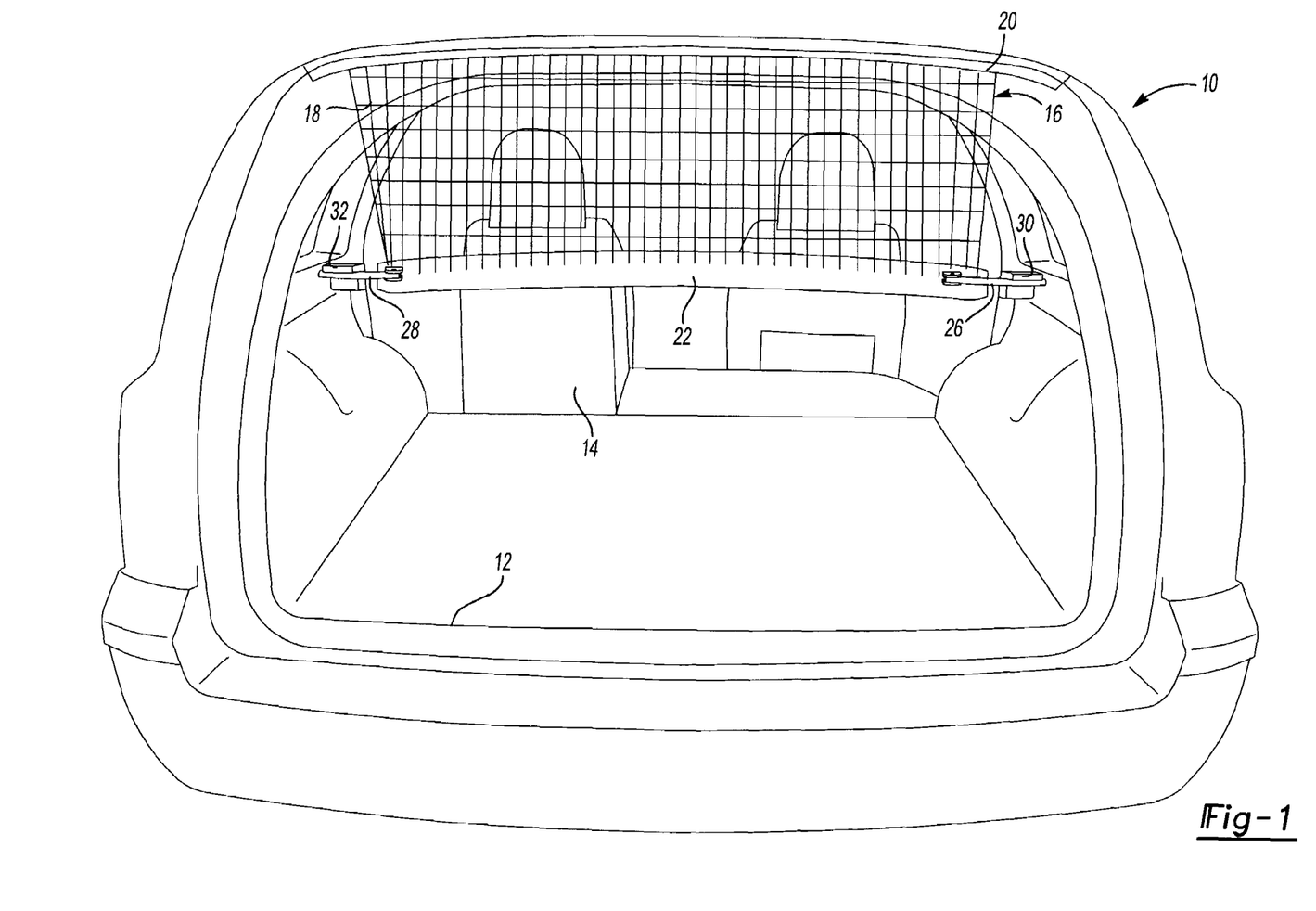
FIG. 1 is a rear perspective view showing a cargo or load net made according to the present invention in its deployed position on a vehicle.

Referring to FIG. 1, a vehicle 10 having a rear door opening 12 is illustrated with the rear door removed for clarity. The rear door may be of the hatch, tailgate or door style. Within the vehicle 10, several seats 14 are shown in an upright position with other seats being folded down and out of view.

A cargo net assembly 16 is shown deployed behind the second row seat 14. The cargo net assembly 16 includes a net 18 that is deployed from a storage receptacle 20. The storage receptacle 20 is preferably mounted on the headliner or roof of the vehicle 10. A base plate 22 is secured to the bottom of the net 18. A right side anchoring arm 26 and left side anchoring arm 28 are secured to opposite ends of the base plate 22. The base plate 22 is secured by the anchoring arms 26 and 28 to right and left anchors 30 and 32 that are in turn attached to the vehicle laterally outboard of the base plate 22.

Figure 7:
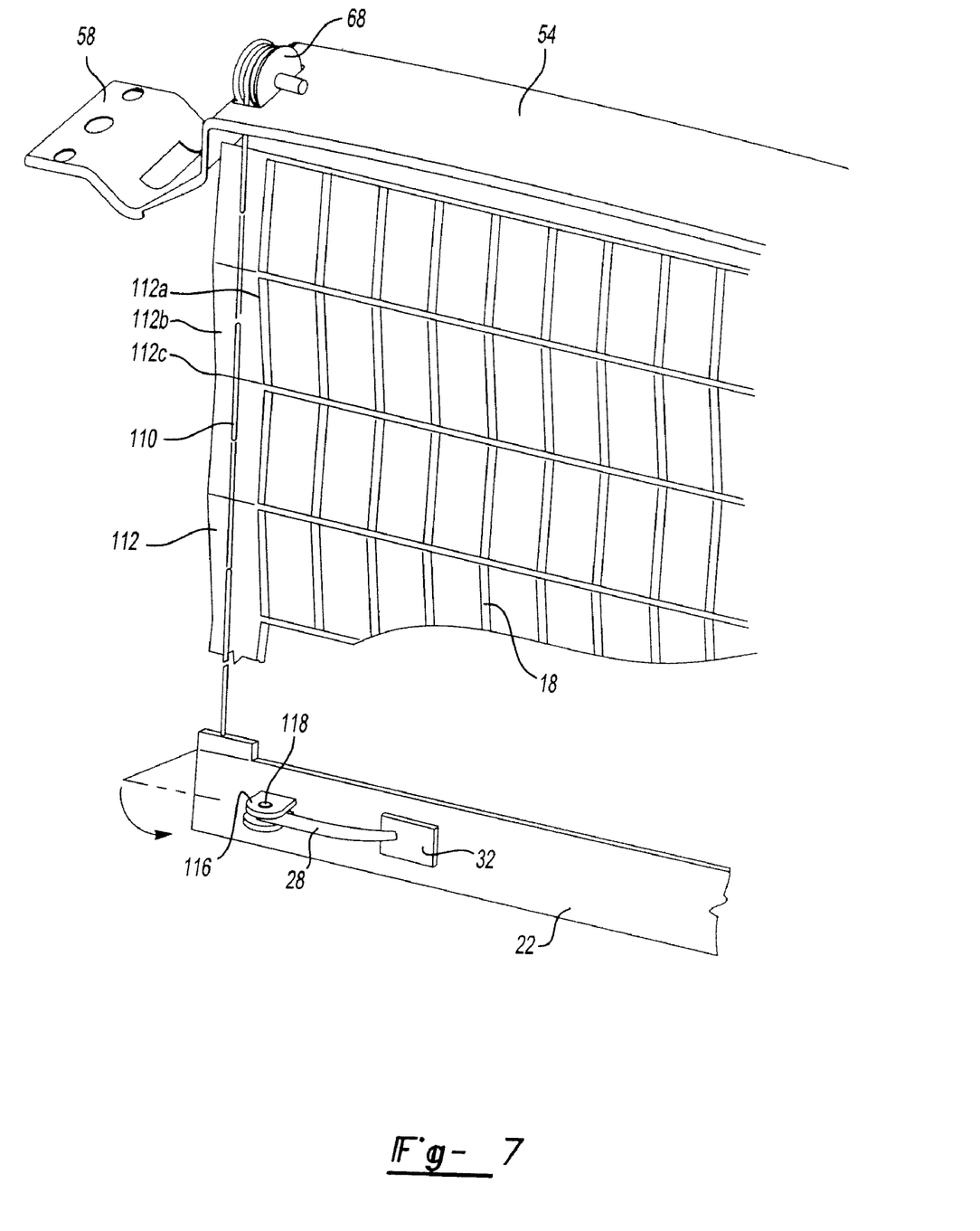
FIG. 7 is a fragmentary perspective view of the cargo net in a partially deployed position.
Figure 8:
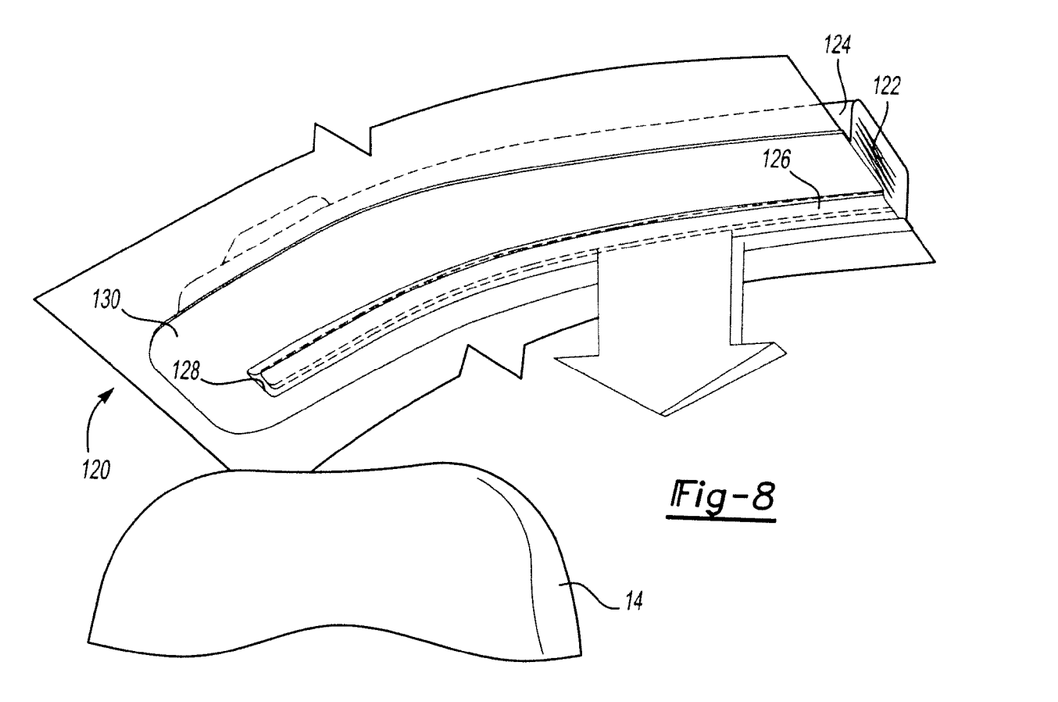
FIG. 8 is a fragmentary perspective view of the load net shown received in the receptacle in its stowed position.

The base plate 22 in the embodiment of FIGS. 1 and 7 rotates from a horizontal stored position to a vertical deployed position. A non-rotating embodiment is shown in FIG. 8 that eliminates the need for anchoring arms 26, 28 and anchors 30, 32.

Figure 2:
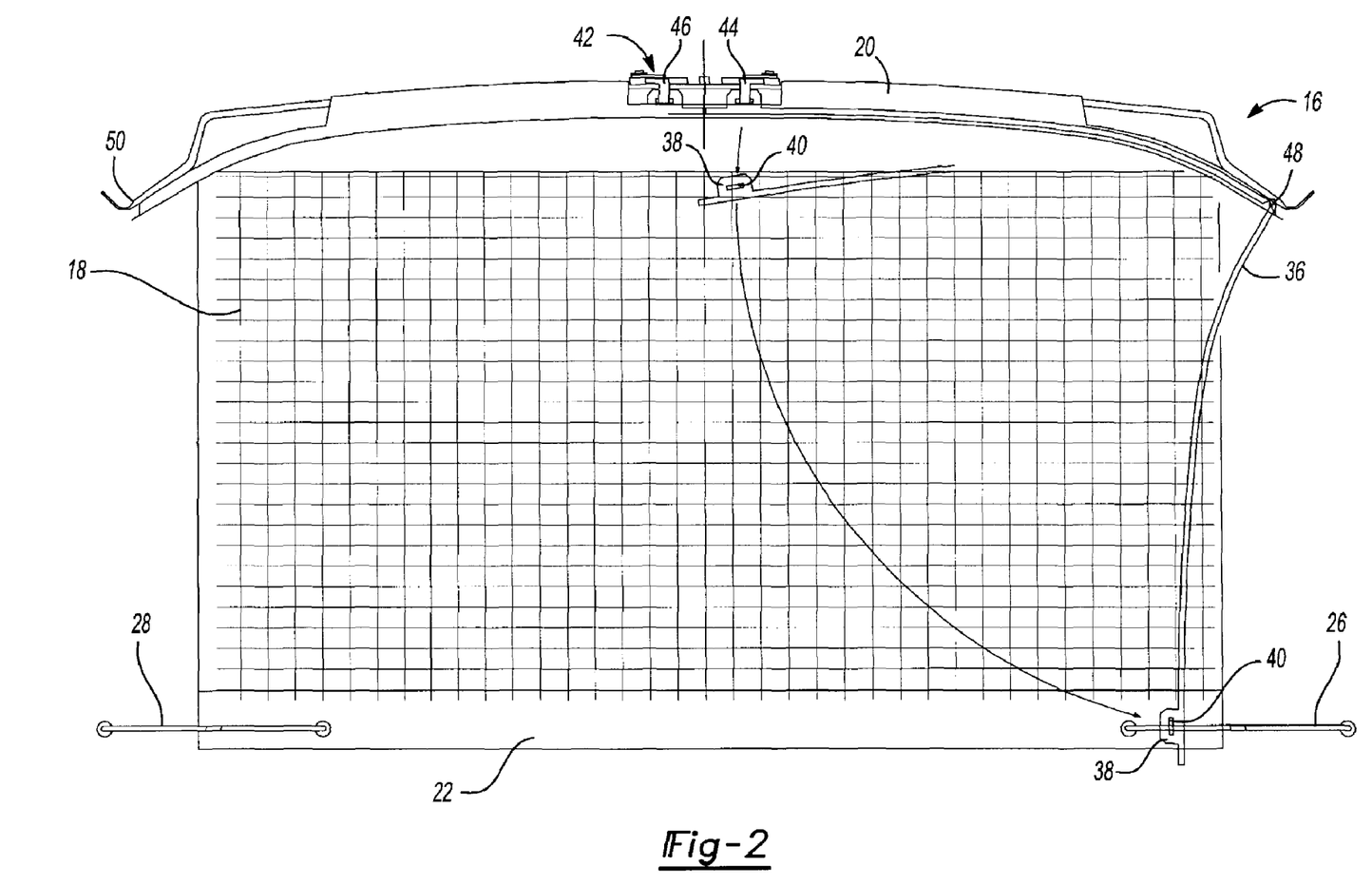
FIG. 2 is a rear elevation view showing the cargo net in its deployed position.

Referring to FIG. 2 the cargo net assembly 16 is shown independent of a vehicle. The cargo net assembly 16 including the net 18 is suspended from and may be stored in the storage receptacle 20. The base plate 22 is also deployed from the storage receptacle 20 as will be more specifically described below. The base plate 22 is held in place by the right and left side anchoring arms 26, 28 when it is in its deployed, or use, position. A right door 36 is used to secure the base plate 22 and net 18 within the storage receptacle 20. The right door 36 has a flange 38 that defines a slot 40. A latch assembly 42 engages the slot 40 in the flange 38 to hold the door 36 closed against the storage receptacle 20. A right rear latch clip 44 and left rear latch clip 46 are shown in FIG. 2. The right rear latch clip 44 may be released to allow the door 36 to pivot on a right pivot connector 48. A left pivot connector 50 is provided for a left door (not shown in FIG. 2) that is a mirror image of the right door 36. The left rear latch clip 46 retains the left door in a manner similar to the right rear latch clip 44.

Figures 3, 3A:
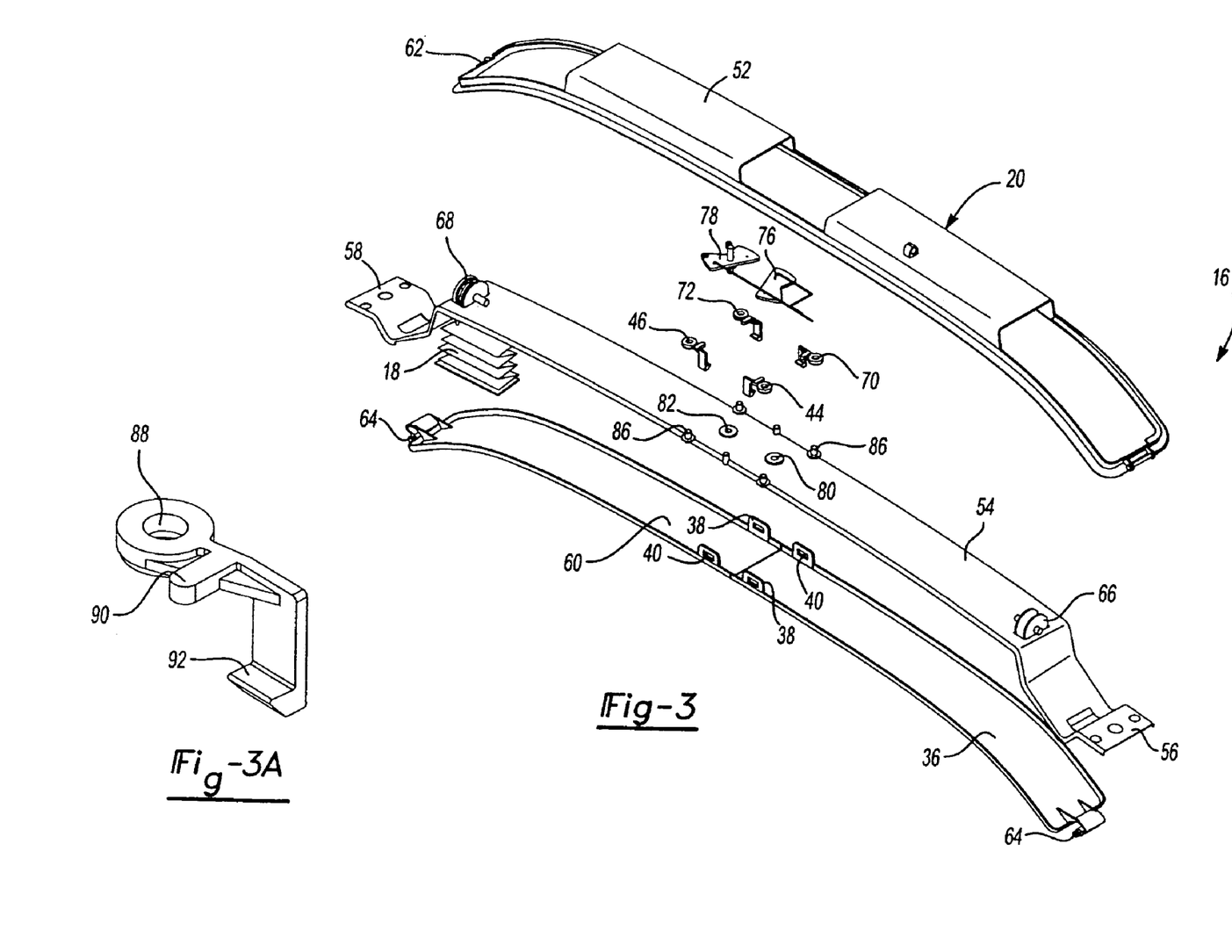
FIG. 3 is an exploded perspective view of the cargo net assembly.
FIG. 3A is an enlarged view of a pivotable retainer clip that is shown in FIG. 3.

Referring to FIG. 3, the cargo net assembly 16 is shown in an exploded view. The cargo net assembly 16 includes the net 18 and storage receptacle 20. The storage receptacle 20 further comprises a housing 52 within which an upper support plate 54 is secured. The upper support plate 54 is secured to the vehicle by right and left attachment flanges 56 and 58.

The right door 36 is shown with a left door 60 that are generally in their closed position. With the right door 36 and left door 60 being in abutment and below the net 18. The right and left doors 36, 60 are each retained on a pivot pin 62 that may be secured to an outboard end of the housing 52. A pin boss 64 is provided on each of the doors 36 and 60. The pivot pin 62 is received in the pin boss 64 to pivotally mount the doors 36, 60 to the housing 52.

A right spool 66 and left spool 68 are provided on right and left sides of the upper support plate 54. The spools 66 and 68 may include a spring return mechanism or, alternatively, the spools could be rotated by means of a motor associated with the spool.

A front right latch clip 70 and front left latch clip 72 are also assembled to the upper support plate 54 directly forward of right and left rear latch clips 44 and 46. The latch clips function to latch the doors 36 and 60 to the support plate 54 when the doors 36, 60 are closed. The latch clips are released by means of right and left bell crank cams 76 and 78 that are assembled to right and left bell crank holes 80 and 82 in the upper support plate 54.

Referring to FIG. 3A, one of the latch clips is shown in greater detail. The latch clips each include a latch clip pin 86, as shown in FIG. 3, and as will be described in greater detail with reference to FIGS. 4-6. Referring back to FIG. 3A, the latch pins each include a pin receptacle 88 that is used to secure the latch clip to one of the latch clip pins 86. A follower 90 is provided on the latch clip to follow the cam surface of the bell crank cam 76 or 78 as it is pivoted. A hook 92 is received in one of the slots 40 to hold the door 36 or 60 in its closed position.

Figure 4:
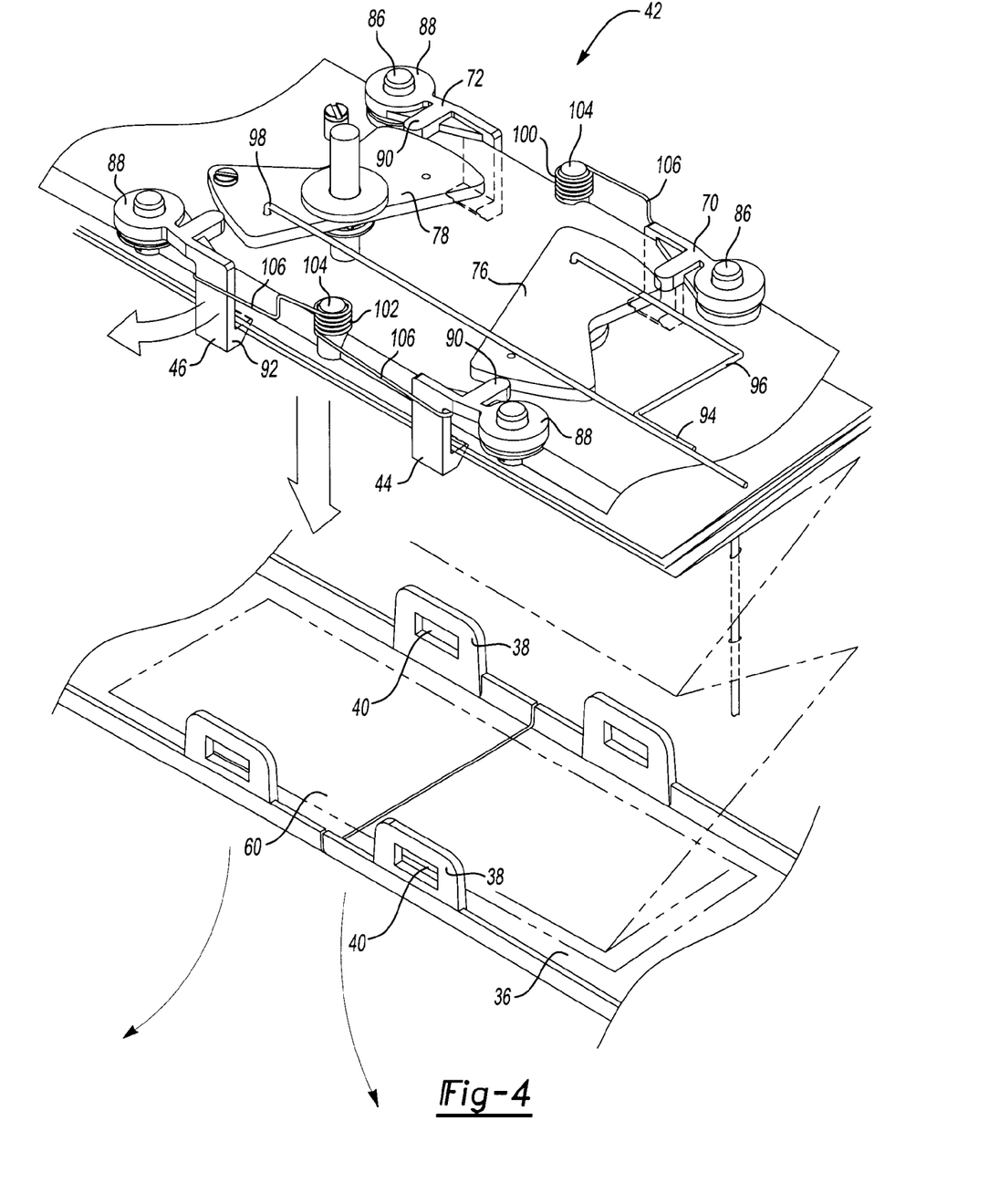
FIG. 4 is a fragmentary exploded perspective view of the cover latch mechanism of the cargo net assembly.

Referring to FIG. 4, the latch assembly 42 is shown in greater detail. The doors 36 and 60 are shown below the latch assembly 42 in their closed position. The arcuate directional arrows below the doors indicate that they are moved in an arcuate pivoting motion, as previously described. The latch assembly 42 operates the latch clips by acting on the bell crank cams 76 and 78. The bell crank cams are operated by a dual cable 94 that is comprised of a right bell crank cable 96 and a left bell crank cable 98. The right and left front latch clips 70, 72 are biased into a latching position by a front return spring 100. The right and left rear latch clips 44, 46 are similarly biased into their latch position by rear return spring 102. The front and rear return springs 100, 102 are each received on a respective spring retention pin 104. Each return spring includes two spring arms 106 that engage and apply a biasing force on the latch clips. Operation of the right and left bell crank cams 76 and 78 will be further described with reference to FIGS. 5 and 6 below.

Figure 5:
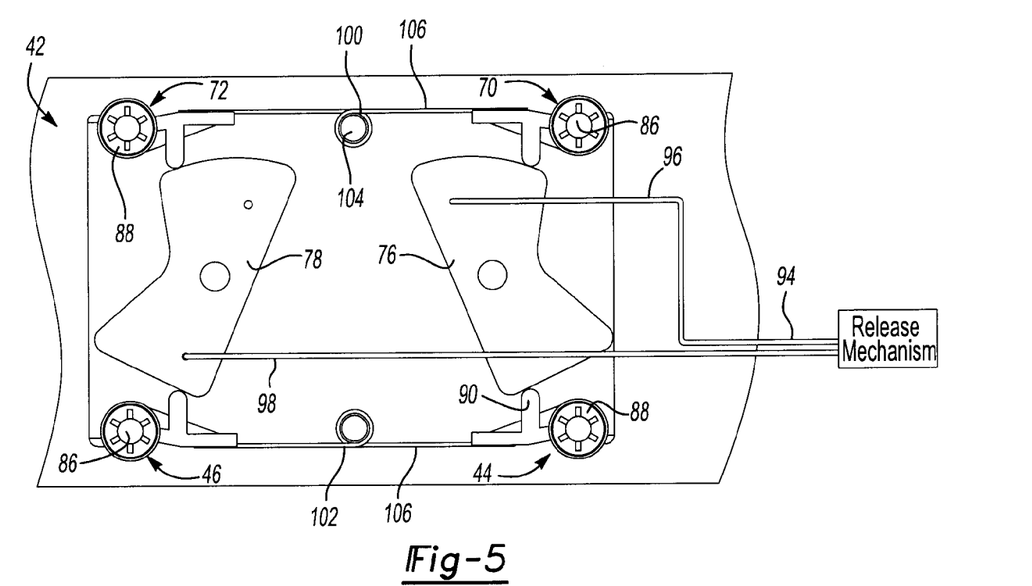
FIG. 5 is a plan view of the cover retention linkage in its latched position.

Referring to FIG. 5, the latch clips 44, 46, 70 and 72 are shown in their latched position. The followers 90 are engaging a cam surface of the bell crank cams 76 and 78 and the springs 100, 102 are disposed on the spring retention pins 104. The arms 106 of the springs are shown biasing the latch clip to their latched position and into engagement with the bell cranks 76 and 78.

Figure 6:
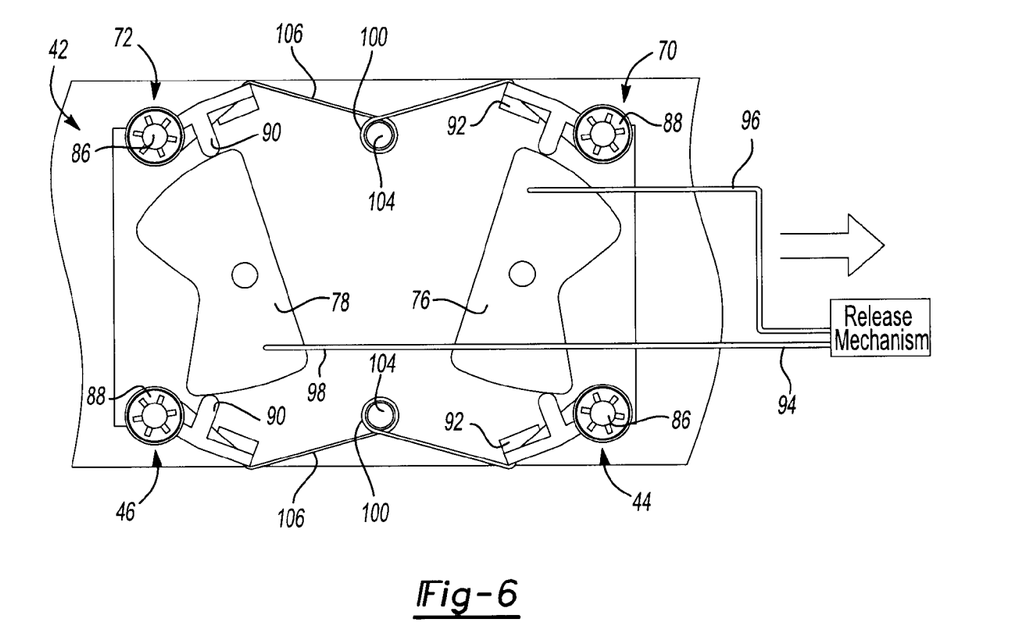
FIG. 6 is a top plan view of the retainer mechanism in its unlatched position.

Referring to FIG. 6, the latch assembly 42 is shown after releasing the latch by pulling the dual cable 94 that in turn pulls the right and left bell crank cables 96, 98. Right bell crank cable 96 rotates bell crank cam 76, while left bell crank cable 98 rotates bell crank cam 78. Rotation of the cams 76, 78 causes the followers 90 to be turned outwardly causing the hook 92 to disengage the slot 40 in the flanges 38 of each of the doors 36 and 60.

In the position shown in FIG. 6, the doors are free to pivot downwardly on the pivot pin 62, as previously described. When pressure is released from the dual cable 94, the springs 100, 102 exert a return force on the latch pin through the spring arms 106. When the latch assembly 42 has returned to the position shown in FIG. 5, the doors 36, 60 may be rotated back to their closed position with the hooks 92 of the latch clips being received in the slot 40 on each of the flanges 38.

Referring to FIG. 7, the cargo net is shown in fragmentary perspective as it is in the process of being deployed. The upper support plate 54 is illustrated with the left spool 68 and left attachment flange 58. The attachment flange 58 is used to secure the upper support plate 54 to the roof of the vehicle. The left spool 68 receives a side support cable 110. Side support cable 110 is received in a side pocket 112 formed on a side of the net 18. Side pocket 112 has three component parts. One part is the edge 112a of the net 18. A second part is a plastic insert 112b on the outer edges that controls bending. A third part is webbing 112c that keeps the plastic insert 112b and edge 112a of the net together while the edge of the net 18 is finished off and that also provides a bendable hinge for the side pocket 112. The base plate 22 is shown below the net 18 and is supported in part by the side support cable 110. The left side anchoring arm 28 is shown pivoted to its storage position, but may be deployed as shown in FIG. 1 with the left anchor 32 engaging an anchoring point on the side of the vehicle. The left side anchoring arm 28 is pivoted relative to a pair of pin attachment flanges 116 that receive a pivot pin 118. The left side anchoring arm 28 is pivoted on the pivot pin 18 from the storage position shown in FIG. 7 to the anchoring position shown in FIG. 1. The non-rotating embodiment does not require pin attachment flanges 116 or the pivot pin 118.

Referring to FIGS. 8-12, a non-rotating base plate embodiment is illustrated that simplifies the structure of the cargo net. The alternative embodiment of a cargo net assembly 120 is illustrated in FIG. 8 in its stored condition. The net assembly 120 includes a net 122 that is stored in a storage receptacle 124. The alternative embodiment of the cargo net assembly 120 is designed to be secured to the headliner or roof of a vehicle. The net 122 is secured on its lower end to a base rail 126 that is received in and covers an opening 128 formed in a lower face 130 of the storage receptacle 124.

Figure 9:
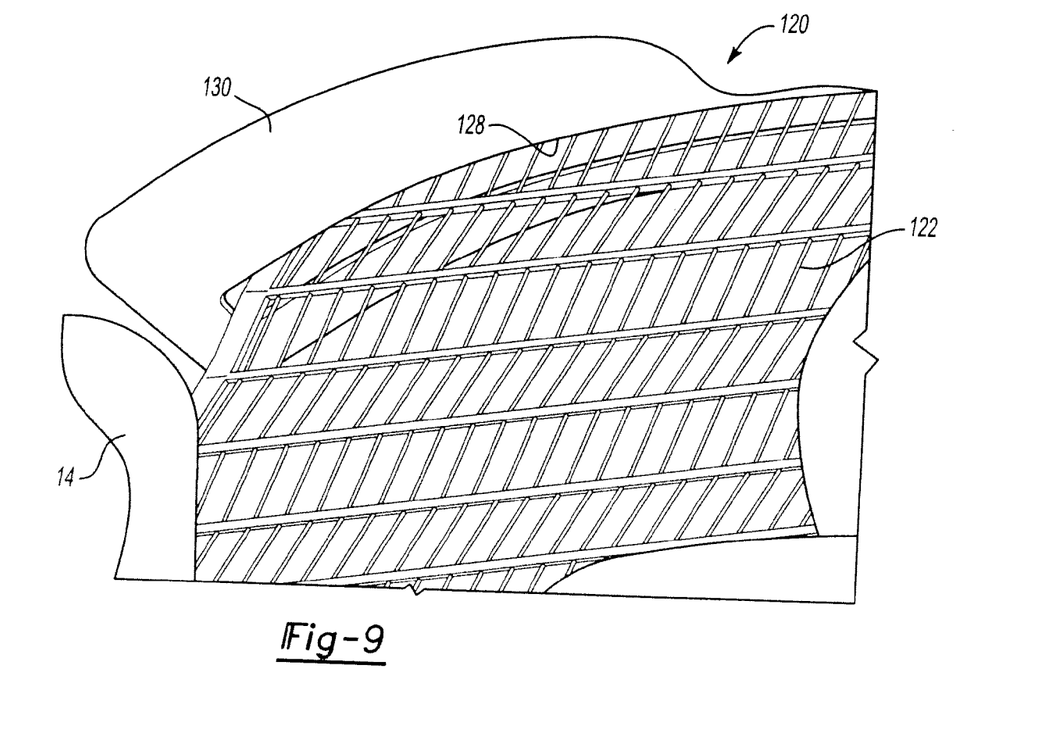
FIG. 9 is a fragmentary perspective view of the load net shown deployed from the receptacle.

Referring to FIG. 9, the net 122 is shown as it is let out from the storage receptacle 124 through the opening 128 in the lower face 130. The net 122 drops down behind vehicle seats 14 and is secured in place as will be described with reference to FIG. 10.

Figure 10:
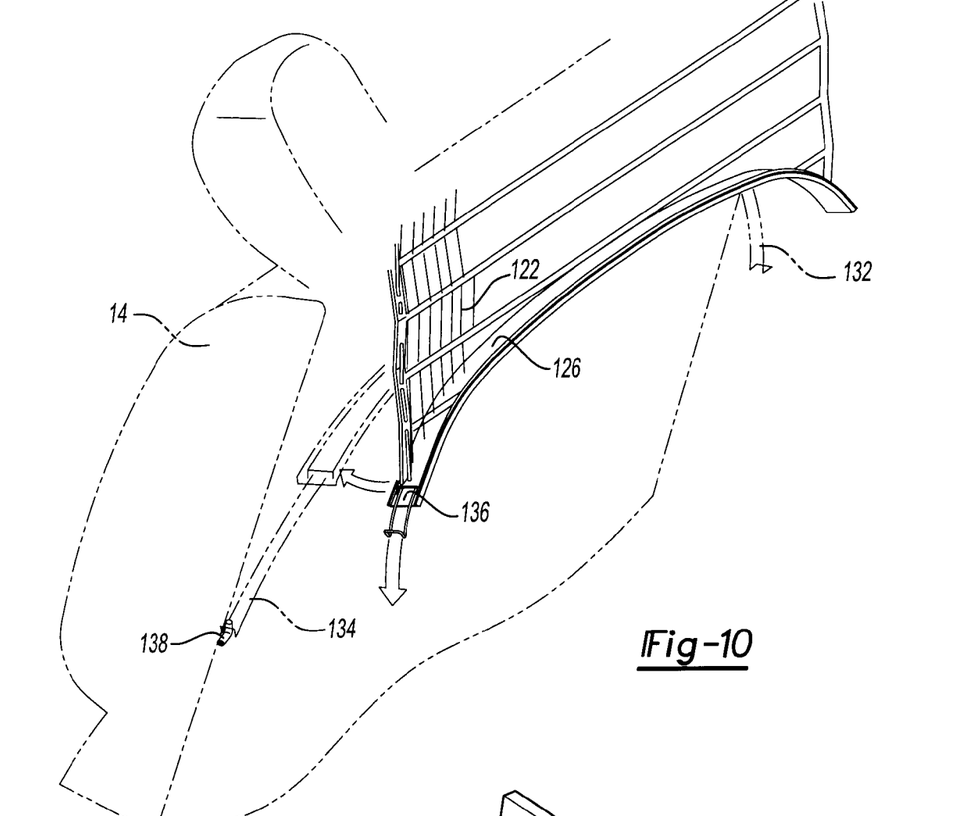
FIG. 10 is a fragmentary perspective view showing the lower end of the load net including the base rail and anchoring loops.

Referring to FIG. 10, the net 122 is shown deployed behind the seats 14. The base rail 126 is lowered below the top of the seats 14 and right and left side anchoring loops 132, 134 are extended from an internal cavity 136 of the base rail 126. The anchoring loops 132, 134 are extended to engage the hooks 138 that are secured to the vehicle.

Figure 11:
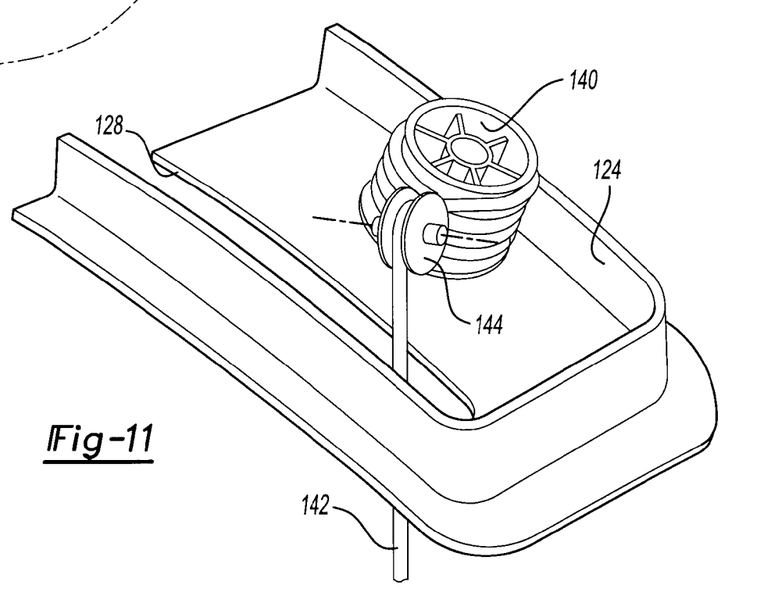
FIG. 11 is a fragmentary perspective view of a take up reel on one end of the receptacle.
Figure 12:
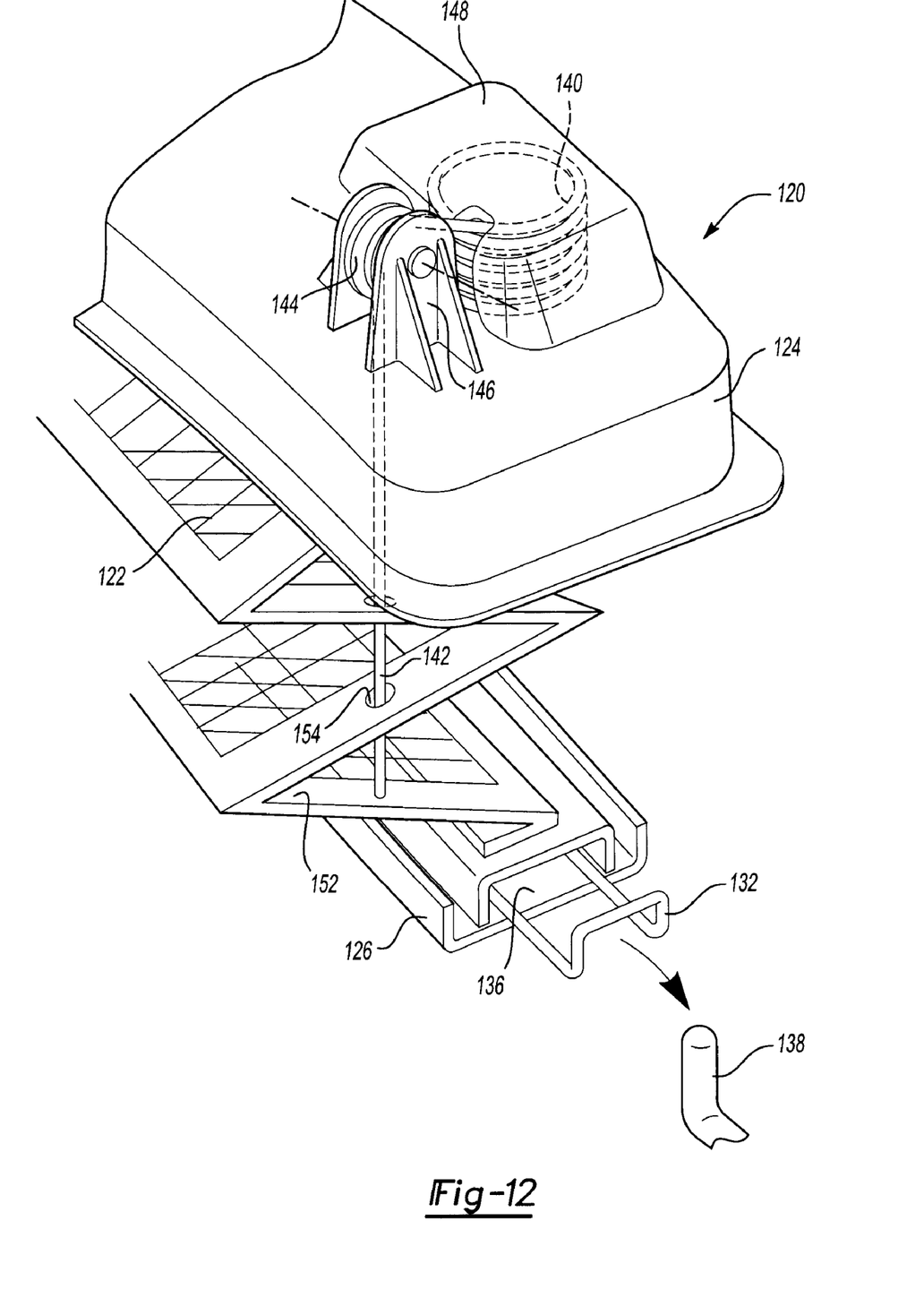
FIG. 12 is a fragmentary perspective view of a cargo net assembly showing the cargo net and base rail partially deployed from the receptacle.

Referring to FIGS. 11 and 12, the mechanism by which the net 122 is lowered and retracted into the storage receptacle 124 is shown in greater detail. A reel 140 that may be a spring-biased take up reel winds a side cable 142 as the net 122 is retracted. The side cable 142 is played out over a guide roller 144 as the net 122 is lowered into its deployed position. Guide roller 144 also guides the rewinding of the cable 142 on the reel 140 as the net 122 is retracted.

Referring specifically to FIG. 12, the guide roller 144 is shown assembled to a guide roller bracket 146 that rotatably holds the guide roller 144. The reel 140 is contained within a reel housing 148 that is provided to enclose and protect reel 140. Two side cables 142 are provided on opposite sides of the net 122. The side cables 142 are preferably routed through a reinforcement tape, hem, or other reinforcing strip. The cable 142 is routed through holes 154 in the reinforcement tape 152. The reinforcement tape 152 may be rigid or flexible and is used to reinforce and stabilize the opposite sides of the net 122.

With further reference to FIG. 12, the mechanism by which the base rail 126 is secured in its lowered position is shown diagrammatically and in greater detail. The right side anchoring loop 132 is extended from the internal cavity 136 of the base rail 126. The anchoring loop 132, when fully extended, may be hooked over the hook 138. Alternatively, an arm could be provided with a different latching mechanism for securing the base rail 126 to the sides of the vehicle when the net 122 is in its deployed position.

While the best mode for carrying out the invention has been described in detail, those familiar with the art to which this invention relates will recognize various alternative designs and embodiments for practicing the invention as defined by the following claims.

What is claimed:

1. A cargo net for a vehicle, the vehicle having a roof, a right side wall, and a left side wall, the interior space within the vehicle being divided by the cargo net into a passenger space and a cargo space, the cargo net comprising:
    a flexible net segment having a top edge, right and left side edges, and a bottom edge;
    a base rail secured near the bottom edge of the net;
    a receptacle secured to the roof of the vehicle, the net being attached near the top edge to the receptacle;
    a cover having two swinging doors, each door being pivotable about an axis;
    a right side attachment clip secured to the right side of the base rail and a left side attachment clip secured to the left side of the base rail, the attachment clips may be secured to the vehicle in a deployed position in which the rail is spaced from the receptacle with the net at least partially spanning the space between the rail and the receptacle, wherein the attachment clips hold the base rail between anchoring points in the interior of the vehicle.

2. The cargo net of claim 1 wherein the net is formed into pleats that fold when the net is retracted for storage in the receptacle.

3. The cargo net of claim 1 wherein the rail is elongated having a first surface that is oriented to face the roof when in a stored position and a second surface that faces in the opposite direction from the first surface, the rail being reoriented when deployed with the first and second surfaces facing in opposite generally fore-and-aft directions.

4. The cargo net of claim 1 wherein the attachment clips are secured to spaced vertical walls of the vehicle when the cargo net is deployed.

5. The cargo net of claim 1 wherein the base rail is secured to the vehicle at a location that is spaced from above a floor of the vehicle when in a lowered position.

6. The cargo net of claim 1 further comprising at least one cord on which the net segment is entrained, the cord being retractable to retract the net segment and the rail toward the receptacle.

7. The cargo net of claim 6 further comprising at least one reel about which the cord may be wound as the cord retracts the net segment and rail toward the receptacle.

8. The cargo net of claim 1, further comprising a each door being pivotable on one lateral side of the receptacle, wherein the doors are in a closed position when the net is stored and the doors are opened to permit the net to be deployed.

9. The cargo net of claim 8 wherein the doors are closed after the base rail is stored.

10. A load net for use with a vehicle, the vehicle defining an interior space that may be divided into a passenger compartment and a cargo compartment at least in part by the load net, the load net comprising:
    a segment of net material;
    a rail secured near a first edge of the segment of net material;
    a first attachment catch assembled to a first end of the rail and a second attachment catch is assembled to a second end of the rail that is located on the opposite end of the rail relative to the first attachment catch;
    a receptacle secured near a second edge of the net material on the opposite side of the load net, wherein the receptacle is attached to the vehicle within the interior space;
    a cover having two doors, each door being pivotable about an axis on the lateral side of the receptacle wherein the doors are closed after the base rail is secured;
    first and second cords extending between rail and the receptacle and along first and second sides of the load net; and
    wherein the load net has a stowed position in which the segment of net material and the rail are received in the receptacle, and a deployed position in which the rail is spaced from the receptacle and the load net spans the space between the rail and the receptacle, the rail being secured to the vehicle by the first and second attachment catches in at least the deployed position.

11. The load net of claim 10 wherein the receptacle is secured to the roof of the vehicle and the rail is moved vertically relative to the receptacle.

12. The load net of claim 10 further comprising first and second reels about which the first and second cords may be wound as the cords retract the net segment and rail toward the receptacle.

13. The load net of claim 10 wherein the segment of net material is formed into pleats that fold when the segment of net material is retracted for storage in the receptacle.

14. The load net of claim 10 wherein the receptacle has a lower face that defines an opening that extends in a transverse direction across the vehicle, the rail when in the stowed position covers the opening.

15. The load net of claim 10 wherein the receptacle has a lower face that defines an opening that extends in a transverse direction across the vehicle, the segment of net material when in the deployed position extends through the opening in the lower face of the receptacle.

16. The load net of claim 10 wherein the first and second catches are anchoring loops that may be extended from an internal cavity in the rail, the anchoring loops being stored in the internal cavity in the rail and are extended from the internal cavity for attachment to the vehicle to hold the load net in the deployed position.

17. The load net of claim 10 wherein the first and second cords are routed through a reinforcing strip on opposite sides of the segment of net material.

18. The load net of claim 17 wherein the reinforcing strip has a plurality of holes through which the first and second cords are routed.

19. A load net for use with a vehicle, the vehicle defining an interior space that may be divided into a passenger compartment and a cargo compartment at least in part by the load net, the load net comprising:
    a segment of net material;
    a base rail secured near a bottom edge of the segment of net material;
    a first anchoring loop assembled to a right end of the base rail and a second anchoring loop is assembled to a left end of the base rail;
    a receptacle to which an upper edge of the net material is secured, the receptacle being attached to the vehicle roof;
    a cover having two doors, each door being pivotable about an axis on the lateral side of the receptacle wherein the doors are closed after the base rail is secure;

first and second cords extending between the base rail and the receptacle, the first and second cords extending along first and second sides of the load net; and wherein the load net has a stowed position in which the segment of net material and the base rail are received in the receptacle, and a deployed position in which the rail is spaced from the receptacle and the load net spans at least a portion of the space between the base rail and the receptacle, the base rail being secured to the vehicle by the first and second anchoring loops in the deployed position.

* * * * *